(12) United States Patent
Shveidel et al.

(10) Patent No.: US 11,487,706 B2
(45) Date of Patent: Nov. 1, 2022

(54) SYSTEM AND METHOD FOR LAZY SNAPSHOTS FOR STORAGE CLUSTER WITH DELTA LOG BASED ARCHITECTURE

(71) Applicant: EMC IP Holding Company, LLC, Hopkinton, MA (US)

(72) Inventors: Vladimir Shveidel, Pardes-Hana (IL); Philip Love, San Jose, CA (US)

(73) Assignee: EMC IP HOLDING COMPANY, LLC, Hopkinton, MA (US)

( * ) Notice: Subject to any disclaimer, the term of this patent is extended or adjusted under 35 U.S.C. 154(b) by 145 days.

(21) Appl. No.: 16/401,995

(22) Filed: May 2, 2019

(65) Prior Publication Data
US 2020/0349110 A1 Nov. 5, 2020

(51) Int. Cl.
*G06F 16/00* (2019.01)
*G06F 16/11* (2019.01)

(52) U.S. Cl.
CPC .................. *G06F 16/128* (2019.01)

(58) Field of Classification Search
None
See application file for complete search history.

(56) References Cited

U.S. PATENT DOCUMENTS

| | | | | |
|---|---|---|---|---|
| 7,155,586 B1* | 12/2006 | Wagner | ............... | G06F 11/1435 711/E12.019 |
| 7,668,386 B2* | 2/2010 | Beatty | ............... | G06T 9/00 382/242 |
| 7,788,242 B2* | 8/2010 | Shavit | ............... | G06F 16/9024 718/107 |
| 7,865,823 B2* | 1/2011 | Matheson | ............... | G06F 40/226 715/237 |
| 8,832,039 B1* | 9/2014 | Sorenson, III | ............... | G06F 11/1448 707/746 |
| 10,425,350 B1* | 9/2019 | Florissi | ............... | H04L 47/762 |
| 10,482,103 B2* | 11/2019 | Lee | ............... | G06F 16/2228 |
| 10,541,938 B1* | 1/2020 | Timmerman | ............... | H04L 43/065 |
| 10,791,063 B1* | 9/2020 | Florissi | ............... | H04L 47/783 |
| 2004/0210608 A1* | 10/2004 | Lee | ............... | G06F 11/1448 |
| 2005/0028137 A1* | 2/2005 | Evans | ............... | G06F 8/48 717/110 |
| 2006/0215923 A1* | 9/2006 | Beatty | ............... | G06T 9/00 382/253 |
| 2007/0061266 A1* | 3/2007 | Moore | ............... | G06Q 50/00 705/51 |

(Continued)

OTHER PUBLICATIONS

Riegel, Torvald, Pascal Felber, and Christof Fetzer. "A lazy snapshot algorithm with eager validation." In International Symposium on Distributed Computing, pp. 284-298. Springer, Berlin, Heidelberg, (Year: 2006).*

*Primary Examiner* — Farhan M Syed
(74) *Attorney, Agent, or Firm* — Brian J. Colandreo; Mark H. Whittenberger; Holland & Knight LLP (57) ABSTRACT

A method, computer program product, and computer system for creating, by a computing device, a child leaf of a snapshot associated with a parent leaf of a volume. At least one entry associated with one of the parent leaf and the child leaf may be added to a delta log. Only delta changes are written to the child leaf. One of a first destaging technique and a second destaging technique may be used for the child leaf.

9 Claims, 5 Drawing Sheets

(56) References Cited

U.S. PATENT DOCUMENTS

| | | | |
|---|---|---|---|
| 2007/0061487 A1* | 3/2007 | Moore | G06F 16/27 |
| | | | 707/E17.032 |
| 2009/0300646 A1* | 12/2009 | Wagner | G06F 9/541 |
| | | | 719/312 |
| 2010/0070678 A1* | 3/2010 | Zhang | G06F 9/45558 |
| | | | 718/1 |
| 2013/0104251 A1* | 4/2013 | Moore | G06F 21/602 |
| | | | 726/30 |
| 2014/0372381 A1* | 12/2014 | Sorenson, III | H04L 67/1097 |
| | | | 707/649 |
| 2017/0212680 A1* | 7/2017 | Waghulde | G06F 16/185 |
| 2017/0220777 A1* | 8/2017 | Wang | G06F 21/6218 |
| 2018/0329967 A1* | 11/2018 | Lee | G06F 16/27 |
| 2020/0042533 A1* | 2/2020 | Lee | G06F 16/27 |

* cited by examiner

SYSTEM AND METHOD FOR LAZY SNAPSHOTS FOR STORAGE CLUSTER WITH DELTA LOG BASED ARCHITECTURE

BACKGROUND

Applying a delta logging approach (e.g., in a storage cluster(s)) may avoid logging of full metadata (MD) pages, which may waste the log/journal resources). As such, just the actual data changes (e.g., delta tuples) may be logged instead. However, in snapshot created flows, there may still be a need to copy/log the entire mapper MD pages (e.g., top/mid/leaf). This massive delta logging (of actually duplicated data) may cause delta log infrastructure overloading, and thereby still wasting NVRAM bandwidth, that causes performance degradation.

BRIEF SUMMARY OF DISCLOSURE

In one example implementation, a method, performed by one or more computing devices, may include but is not limited to creating, by a computing device, a child leaf of a snapshot associated with a parent leaf of a volume. At least one entry associated with one of the parent leaf and the child leaf may be added to a delta log. Only delta changes may be written to the child leaf. One of a first destaging technique and a second destaging technique may be used for the child leaf.

One or more of the following example features may be included. Using one of the first destaging technique and the second destaging technique for the child leaf may include determining whether the at least one entry associated with one of the parent leaf and the child leaf is found in the delta log indicating a dependency between the parent leaf and the child leaf. The first destaging technique may be used when the at least one entry associated with one of the parent leaf and the child leaf is not found in the delta log indicating a lack of the dependency. The second destaging technique may be used when the at least one entry associated with one of the parent leaf and the child leaf is found in the delta log indicating the dependency. The second destaging technique may include building an up-to-date version of a page associated with the parent leaf. The second destaging technique may further include using the up-to-date version of the page associated with the parent leaf as a base for building the child leaf. The second destaging technique may further include updating a page associated with the child leaf by applying all deltas associated with the parent leaf and the child leaf.

In another example implementation, a computing system may include one or more processors and one or more memories configured to perform operations that may include but are not limited to creating a child leaf of a snapshot associated with a parent leaf of a volume. At least one entry associated with one of the parent leaf and the child leaf may be added to a delta log. Only delta changes may be written to the child leaf. One of a first destaging technique and a second destaging technique may be used for the child leaf.

One or more of the following example features may be included. Using one of the first destaging technique and the second destaging technique for the child leaf may include determining whether the at least one entry associated with one of the parent leaf and the child leaf is found in the delta log indicating a dependency between the parent leaf and the child leaf. The first destaging technique may be used when the at least one entry associated with one of the parent leaf and the child leaf is not found in the delta log indicating a lack of the dependency. The second destaging technique may be used when the at least one entry associated with one of the parent leaf and the child leaf is found in the delta log indicating the dependency. The second destaging technique may include building an up-to-date version of a page associated with the parent leaf. The second destaging technique may further include using the up-to-date version of the page associated with the parent leaf as a base for building the child leaf. The second destaging technique may further include updating a page associated with the child leaf by applying all deltas associated with the parent leaf and the child leaf.

In another example implementation, a computer program product may reside on a computer readable storage medium having a plurality of instructions stored thereon which, when executed across one or more processors, may cause at least a portion of the one or more processors to perform operations that may include but are not limited to creating a child leaf of a snapshot associated with a parent leaf of a volume. At least one entry associated with one of the parent leaf and the child leaf may be added to a delta log. Only delta changes may be written to the child leaf. One of a first destaging technique and a second destaging technique may be used for the child leaf.

One or more of the following example features may be included. Using one of the first destaging technique and the second destaging technique for the child leaf may include determining whether the at least one entry associated with one of the parent leaf and the child leaf is found in the delta log indicating a dependency between the parent leaf and the child leaf. The first destaging technique may be used when the at least one entry associated with one of the parent leaf and the child leaf is not found in the delta log indicating a lack of the dependency. The second destaging technique may be used when the at least one entry associated with one of the parent leaf and the child leaf is found in the delta log indicating the dependency. The second destaging technique may include building an up-to-date version of a page associated with the parent leaf. The second destaging technique may further include using the up-to-date version of the page associated with the parent leaf as a base for building the child leaf. The second destaging technique may further include updating a page associated with the child leaf by applying all deltas associated with the parent leaf and the child leaf.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

System Overview:

In some implementations, the present disclosure may be embodied as a method, system, or computer program product. Accordingly, in some implementations, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, in some implementations, the present disclosure may take the form of a computer program product on a computer-usable storage medium having computer-usable program code embodied in the medium.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

In some implementations, a computer readable signal medium may include a propagated data signal with computer readable program code embodied therein, for example, in baseband or as part of a carrier wave. In some implementations, such a propagated signal may take any of a variety of forms, including, but not limited to, electromagnetic, optical, or any suitable combination thereof. In some implementations, the computer readable program code may be transmitted using any appropriate medium, including but not limited to the internet, wireline, optical fiber cable, RF, etc. In some implementations, a computer readable signal medium may be any computer readable medium that is not a computer readable storage medium and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like. Java® and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider). In some implementations, electronic circuitry including, for example, programmable logic circuitry, field-programmable gate arrays (FPGAs) or other hardware accelerators, micro-controller units (MCUs), or programmable logic arrays (PLAs) may execute the computer readable program instructions/code by utilizing state information of the computer readable program instructions to personalize the electronic circuitry, in order to perform aspects of the present disclosure.

In some implementations, the flowchart and block diagrams in the figures illustrate the architecture, functionality, and operation of possible implementations of apparatus (systems), methods and computer program products according to various implementations of the present disclosure. Each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of the order noted in the figures (or combined or omitted). For example, two blocks shown in succession may, in fact, be executed substantially concurrently, or the blocks may sometimes be executed in the reverse order, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Figure 1:
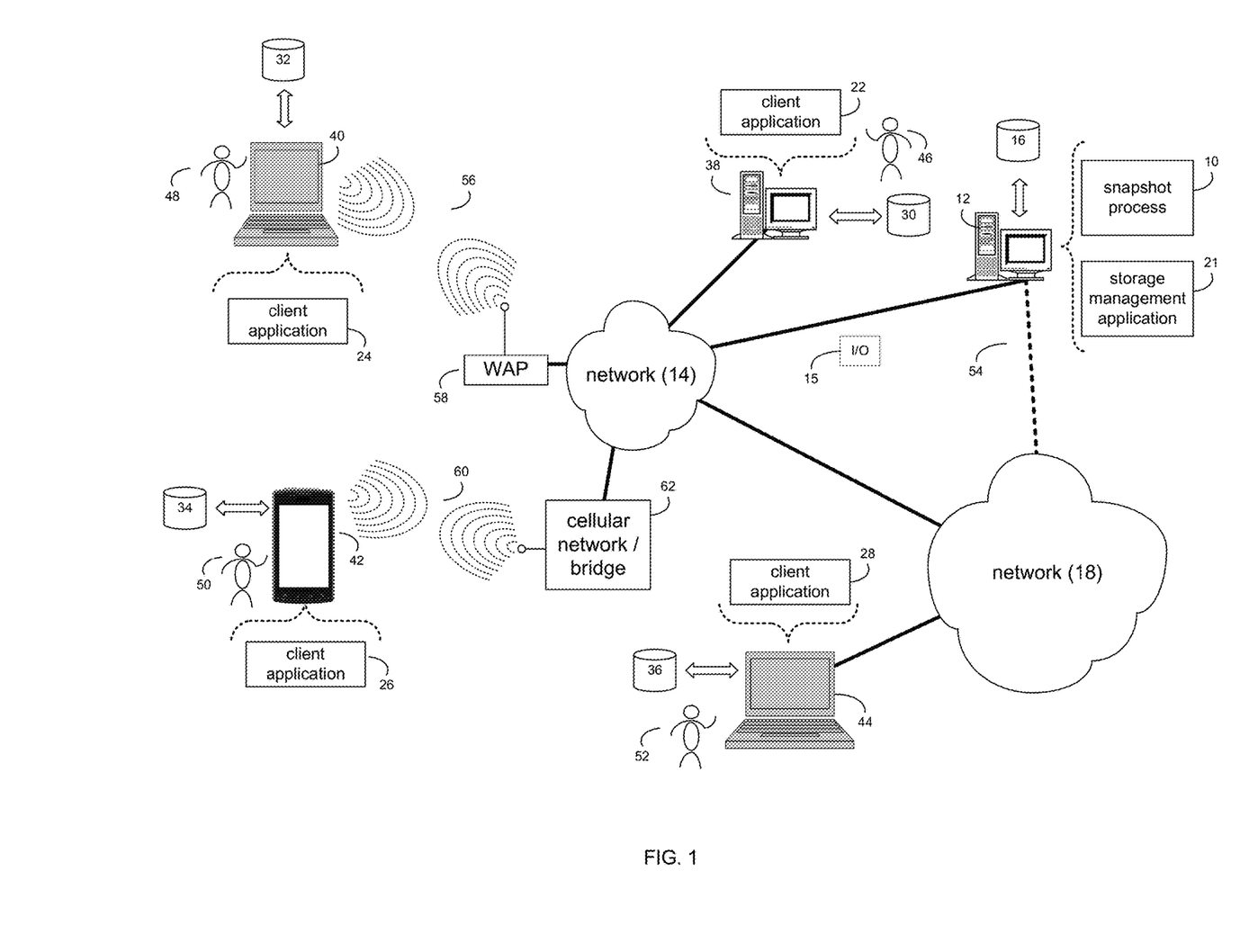
FIG. 1 is an example diagrammatic view of a snapshot process coupled to an example distributed computing network according to one or more example implementations of the disclosure.

Referring now to the example implementation of FIG. 1, there is shown snapshot process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a storage system (e.g., a Network Attached Storage (NAS) system, a Storage Area Network (SAN)), a personal computer(s), a laptop computer(s), mobile computing device(s), a server computer, a series of server computers, a mainframe computer(s), or a computing cloud(s). As is known in the art, a SAN may include one or more of the client electronic devices, including a RAID device and a NAS system. In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 12 may execute an operating system, for example, but not limited to, Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a snapshot process, such as snapshot process 10 of FIG. 1, may create a child leaf of a snapshot associated with a parent leaf of a volume. At least one entry associated with one of the parent leaf and the child leaf may be added to a delta log. Only delta changes may be written to the child leaf. One of a first destaging technique and a second destaging technique may be used for the child leaf.

In some implementations, the instruction sets and subroutines of snapshot process 10, which may be stored on storage device, such as storage device 16, coupled to computer 12, may be executed by one or more processors and one or more memory architectures included within computer 12. In some implementations, storage device 16 may include but is not limited to: a hard disk drive; all forms of flash memory storage devices; a tape drive; an optical drive; a RAID array (or other array); a random access memory (RAM); a read-only memory (ROM); or combination thereof. In some implementations, storage device 16 may be organized as an extent, an extent pool, a RAID extent (e.g., an example 4D+1P R5, where the RAID extent may include, e.g., five storage device extents that may be allocated from, e.g., five different storage devices), a mapped RAID (e.g., a collection of RAID extents), or combination thereof.

In some implementations, network 14 may be connected to one or more secondary networks (e.g., network 18), examples of which may include but are not limited to: a local area network; a wide area network or other telecommunications network facility; or an intranet, for example. The phrase "telecommunications network facility," as used herein, may refer to a facility configured to transmit, and/or receive transmissions to/from one or more mobile client electronic devices (e.g., cellphones, etc.) as well as many others.

In some implementations, computer 12 may include a data store, such as a database (e.g., relational database, object-oriented database, triplestore database, etc.) and may be located within any suitable memory location, such as storage device 16 coupled to computer 12. In some implementations, data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. In some implementations, the data store may also be a custom database, such as, for example, a flat file database or an XML, database. In some implementations, any other form(s) of a data storage structure and/or organization may also be used. In some implementations, snapshot process 10 may be a component of the data store, a standalone application that interfaces with the above noted data store and/or an applet/application that is accessed via client applications 22, 24, 26, 28. In some implementations, the above noted data store may be, in whole or in part, distributed in a cloud computing topology. In this way, computer 12 and storage device 16 may refer to multiple devices, which may also be distributed throughout the network.

In some implementations, computer 12 may execute a storage management application (e.g., storage management application 21), examples of which may include, but are not limited to, e.g., a storage system application, a cloud computing application, a data synchronization application, a data migration application, a garbage collection application, or other application that allows for the implementation and/or management of data in a clustered (or non-clustered) environment (or the like). In some implementations, snapshot process 10 and/or storage management application 21 may be accessed via one or more of client applications 22, 24, 26, 28. In some implementations, snapshot process 10 may be a standalone application, or may be an applet/application/script/extension that may interact with and/or be executed within storage management application 21, a component of storage management application 21, and/or one or more of client applications 22, 24, 26, 28. In some implementations, storage management application 21 may be a standalone application, or may be an applet/application/script/extension that may interact with and/or be executed within snapshot process 10, a component of snapshot process 10, and/or one or more of client applications 22, 24, 26, 28. In some implementations, one or more of client applications 22, 24, 26, 28 may be a standalone application, or may be an applet/application/script/extension that may interact with and/or be executed within and/or be a component of snapshot process 10 and/or storage management application 21. Examples of client applications 22, 24, 26, 28 may include, but are not limited to, e.g., a storage system application, a cloud computing application, a data synchronization application, a data migration application, a garbage collection application, or other application that allows for the implementation and/or management of data in a clustered (or non-clustered) environment (or the like), a standard and/or mobile web browser, an email application (e.g., an email client application), a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors and one or more memory architectures incorporated into client electronic devices 38, 40, 42, 44.

In some implementations, one or more of storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet, a server, a television, a smart television, a smart speaker, an Internet of Things (IoT) device, a media (e.g., video, photo, etc.) capturing device, and a dedicated network device. Client electronic devices 38, 40, 42, 44 may each execute an operating system, examples of which may include but are not limited to, Android™, Apple® iOS®, Mac® OS X®; Red Hat® Linux®, Windows® Mobile, Chrome OS, Blackberry OS, Fire OS, or a custom operating system.

In some implementations, one or more of client applications 22, 24, 26, 28 may be configured to effectuate some or all of the functionality of snapshot process 10 (and vice versa). Accordingly, in some implementations, snapshot process 10 may be a purely server-side application, a purely client-side application, or a hybrid server-side/client-side application that is cooperatively executed by one or more of client applications 22, 24, 26, 28 and/or snapshot process 10.

In some implementations, one or more of client applications 22, 24, 26, 28 may be configured to effectuate some or all of the functionality of storage management application 21 (and vice versa). Accordingly, in some implementations, storage management application 21 may be a purely server-side application, a purely client-side application, or a hybrid server-side/client-side application that is cooperatively executed by one or more of client applications 22, 24, 26, 28 and/or storage management application 21. As one or more of client applications 22, 24, 26, 28, snapshot process 10, and storage management application 21, taken singly or in any combination, may effectuate some or all of the same functionality, any description of effectuating such functionality via one or more of client applications 22, 24, 26, 28, snapshot process 10, storage management application 21, or combination thereof, and any described interaction(s) between one or more of client applications 22, 24, 26, 28, snapshot process 10, storage management application 21, or combination thereof to effectuate such functionality, should be taken as an example only and not to limit the scope of the disclosure.

In some implementations, one or more of users 46, 48, 50, 52 may access computer 12 and snapshot process 10 (e.g., using one or more of client electronic devices 38, 40, 42, 44) directly through network 14 or through secondary network 18. Further, computer 12 may be connected to network 14 through secondary network 18, as illustrated with phantom link line 54. Snapshot process 10 may include one or more user interfaces, such as browsers and textual or graphical user interfaces, through which users 46, 48, 50, 52 may access snapshot process 10.

In some implementations, the various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, 802.11n, 802.11ac, Wi-Fi®, RFID, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown by example directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

In some implementations, various I/O requests (e.g., I/O request 15) may be sent from, e.g., client applications 22, 24, 26, 28 to, e.g., computer 12. Examples of I/O request 15 may include but are not limited to, data write requests (e.g., a request that content be written to computer 12) and data read requests (e.g., a request that content be read from computer 12).

Figure 2:
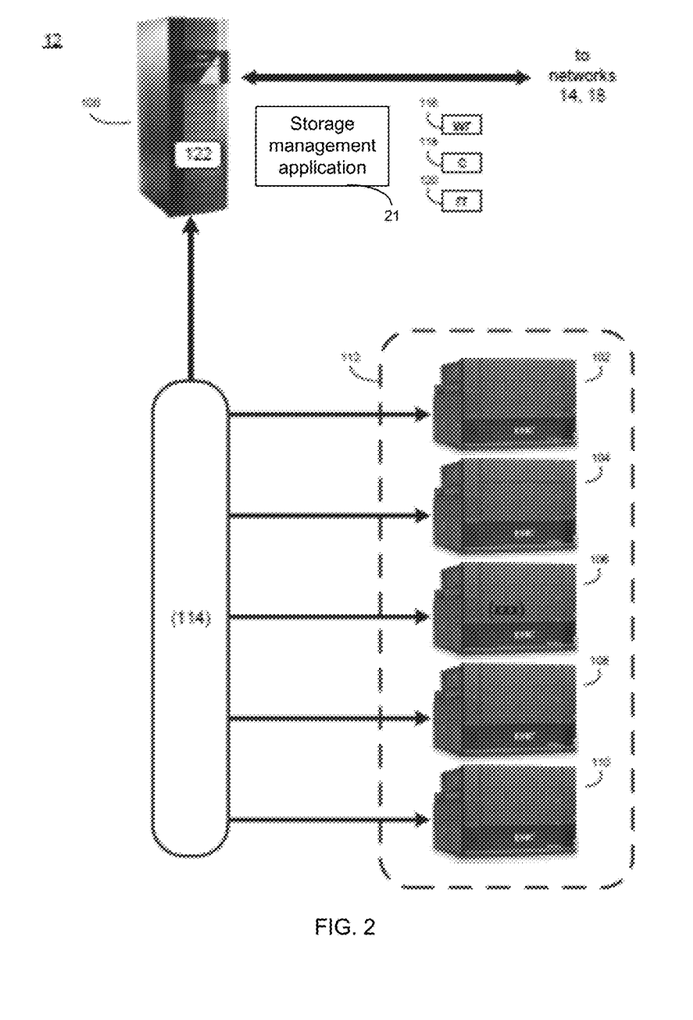
FIG. 2 is an example diagrammatic view of a storage system of FIG. 1 according to one or more example implementations of the disclosure.
Figure 3:
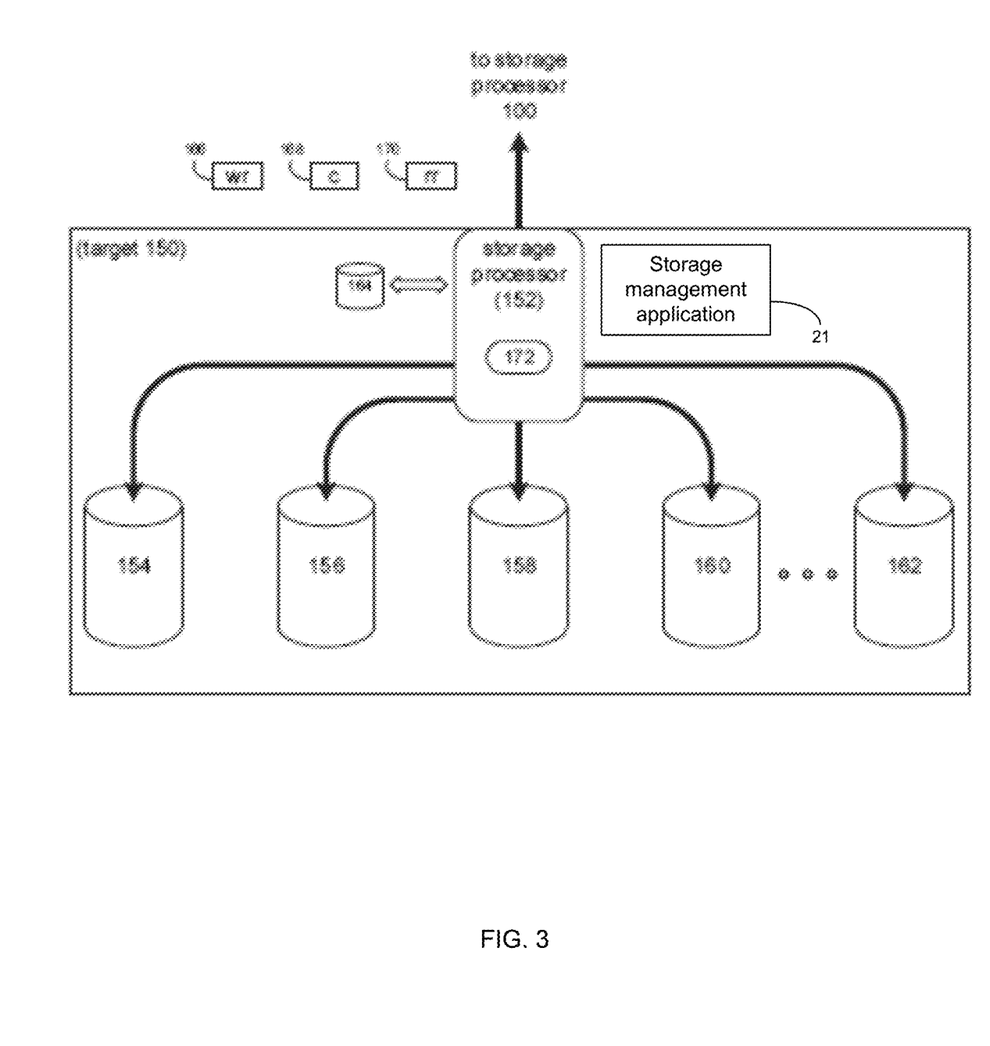
FIG. 3 is an example diagrammatic view of a storage target of FIG. 1 according to one or more example implementations of the disclosure.

Data Storage System:

Referring also to the example implementation of FIGS. 2-3 (e.g., where computer 12 may be configured as a data storage system), computer 12 may include storage processor 100 and a plurality of storage targets (e.g., storage targets 102, 104, 106, 108, 110). In some implementations, storage targets 102, 104, 106, 108, 110 may include any of the above-noted storage devices. In some implementations, storage targets 102, 104, 106, 108, 110 may be configured to provide various levels of performance and/or high availability. For example, storage targets 102, 104, 106, 108, 110 may be configured to form a non-fully-duplicative fault-tolerant data storage system (such as a non-fully-duplicative RAID data storage system), examples of which may include but are not limited to: RAID 3 arrays, RAID 4 arrays, RAID 5 arrays, and/or RAID 6 arrays. It will be appreciated that various other types of RAID arrays may be used without departing from the scope of the present disclosure.

While in this particular example, computer 12 is shown to include five storage targets (e.g., storage targets 102, 104, 106, 108, 110), this is for example purposes only and is not intended limit the present disclosure. For instance, the actual number of storage targets may be increased or decreased depending upon, e.g., the level of redundancy/performance/capacity required.

Further, the storage targets (e.g., storage targets 102, 104, 106, 108, 110) included with computer 12 may be configured to form a plurality of discrete storage arrays. For instance, and assuming for example purposes only that computer 12 includes, e.g., ten discrete storage targets, a first five targets (of the ten storage targets) may be configured to form a first RAID array and a second five targets (of the ten storage targets) may be configured to form a second RAID array.

In some implementations, one or more of storage targets 102, 104, 106, 108, 110 may be configured to store coded data (e.g., via storage management process 21), wherein such coded data may allow for the regeneration of data lost/corrupted on one or more of storage targets 102, 104, 106, 108, 110. Examples of such coded data may include but is not limited to parity data and Reed-Solomon data. Such coded data may be distributed across all of storage targets 102, 104, 106, 108, 110 or may be stored within a specific storage target.

Examples of storage targets 102, 104, 106, 108, 110 may include one or more data arrays, wherein a combination of storage targets 102, 104, 106, 108, 110 (and any processing/control systems associated with storage management application 21) may form data array 112.

The manner in which computer 12 is implemented may vary depending upon e.g., the level of redundancy/performance/capacity required. For example, computer 12 may be configured as a SAN (i.e., a Storage Area Network), in which storage processor 100 may be, e.g., a dedicated computing system and each of storage targets 102, 104, 106, 108, 110 may be a RAID device. An example of storage processor 100 may include but is not limited to a VPLEX™ system offered by Dell EMC™ of Hopkinton, Mass.

In the example where computer 12 is configured as a SAN, the various components of computer 12 (e.g., storage processor 100, and storage targets 102, 104, 106, 108, 110) may be coupled using network infrastructure 114, examples of which may include but are not limited to an Ethernet (e.g., Layer 2 or Layer 3) network, a fiber channel network, an InfiniBand network, or any other circuit switched/packet switched network.

As discussed above, various I/O requests (e.g., I/O request 15) may be generated. For example, these I/O requests may be sent from, e.g., client applications 22, 24, 26, 28 to, e.g., computer 12. Additionally/alternatively (e.g., when storage processor 100 is configured as an application server or otherwise), these I/O requests may be internally generated within storage processor 100 (e.g., via storage management process 21). Examples of I/O request 15 may include but are not limited to data write request 116 (e.g., a request that content 118 be written to computer 12) and data read request 120 (e.g., a request that content 118 be read from computer 12).

In some implementations, during operation of storage processor 100, content 118 to be written to computer 12 may be received and/or processed by storage processor 100 (e.g., via storage management process 21). Additionally/alternatively (e.g., when storage processor 100 is configured as an application server or otherwise), content 118 to be written to computer 12 may be internally generated by storage processor 100 (e.g., via storage management process 21).

As discussed above, the instruction sets and subroutines of storage management application 21, which may be stored on storage device 16 included within computer 12, may be executed by one or more processors and one or more memory architectures included with computer 12. Accordingly, in addition to being executed on storage processor 100, some or all of the instruction sets and subroutines of storage management application 21 (and/or snapshot process 10) may be executed by one or more processors and one or more memory architectures included with data array 112.

In some implementations, storage processor 100 may include front end cache memory system 122. Examples of front end cache memory system 122 may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

In some implementations, storage processor 100 may initially store content 118 within front end cache memory system 122. Depending upon the manner in which front end cache memory system 122 is configured, storage processor 100 (e.g., via storage management process 21) may immediately write content 118 to data array 112 (e.g., if front end cache memory system 122 is configured as a write-through cache) or may subsequently write content 118 to data array 112 (e.g., if front end cache memory system 122 is configured as a write-back cache).

In some implementations, one or more of storage targets 102, 104, 106, 108, 110 may include a backend cache memory system. Examples of the backend cache memory system may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

Storage Targets:

As discussed above, one or more of storage targets 102, 104, 106, 108, 110 may be a RAID device. For instance, and referring also to FIG. 3, there is shown example target 150, wherein target 150 may be one example implementation of a RAID implementation of, e.g., storage target 102, storage target 104, storage target 106, storage target 108, and/or storage target 110. An example of target 150 may include but is not limited to a VNX™ system offered by Dell EMC™ of Hopkinton, Mass. Examples of storage devices 154, 156, 158, 160, 162 may include one or more electro-mechanical hard disk drives, one or more solid-state/flash devices, and/or any of the above-noted storage devices. It will be appreciated that while the term "disk" or "drive" may be used throughout, these may refer to and be used interchangeably with any types of appropriate storage devices as the context and functionality of the storage device permits.

In some implementations, target 150 may include storage processor 152 and a plurality of storage devices (e.g., storage devices 154, 156, 158, 160, 162). Storage devices

154, 156, 158, 160, 162 may be configured to provide various levels of performance and/or high availability (e.g., via storage management process 21). For example, one or more of storage devices 154, 156, 158, 160, 162 (or any of the above-noted storage devices) may be configured as a RAID 0 array, in which data is striped across storage devices. By striping data across a plurality of storage devices, improved performance may be realized. However, RAID 0 arrays may not provide a level of high availability. Accordingly, one or more of storage devices 154, 156, 158, 160, 162 (or any of the above-noted storage devices) may be configured as a RAID 1 array, in which data is mirrored between storage devices. By mirroring data between storage devices, a level of high availability may be achieved as multiple copies of the data may be stored within storage devices 154, 156, 158, 160, 162.

While storage devices 154, 156, 158, 160, 162 are discussed above as being configured in a RAID 0 or RAID 1 array, this is for example purposes only and not intended to limit the present disclosure, as other configurations are possible. For example, storage devices 154, 156, 158, 160, 162 may be configured as a RAID 3, RAID 4, RAID 5 or RAID 6 array.

While in this particular example, target 150 is shown to include five storage devices (e.g., storage devices 154, 156, 158, 160, 162), this is for example purposes only and not intended to limit the present disclosure. For instance, the actual number of storage devices may be increased or decreased depending upon, e.g., the level of redundancy/performance/capacity required.

In some implementations, one or more of storage devices 154, 156, 158, 160, 162 may be configured to store (e.g., via storage management process 21) coded data, wherein such coded data may allow for the regeneration of data lost/corrupted on one or more of storage devices 154, 156, 158, 160, 162. Examples of such coded data may include but are not limited to parity data and Reed-Solomon data. Such coded data may be distributed across all of storage devices 154, 156, 158, 160, 162 or may be stored within a specific storage device.

The manner in which target 150 is implemented may vary depending upon e.g., the level of redundancy/performance/capacity required. For example, target 150 may be a RAID device in which storage processor 152 is a RAID controller card and storage devices 154, 156, 158, 160, 162 are individual "hot-swappable" hard disk drives. Another example of target 150 may be a RAID system, examples of which may include but are not limited to an NAS (i.e., Network Attached Storage) device or a SAN (i.e., Storage Area Network).

In some implementations, storage target 150 may execute all or a portion of storage management application 21. The instruction sets and subroutines of storage management application 21, which may be stored on a storage device (e.g., storage device 164) coupled to storage processor 152, may be executed by one or more processors and one or more memory architectures included with storage processor 152. Storage device 164 may include but is not limited to any of the above-noted storage devices.

As discussed above, computer 12 may be configured as a SAN, wherein storage processor 100 may be a dedicated computing system and each of storage targets 102, 104, 106, 108, 110 may be a RAID device. Accordingly, when storage processor 100 processes data requests 116, 120, storage processor 100 (e.g., via storage management process 21) may provide the appropriate requests/content (e.g., write request 166, content 168 and read request 170) to, e.g., storage target 150 (which is representative of storage targets 102, 104, 106, 108 and/or 110).

In some implementations, during operation of storage processor 152, content 168 to be written to target 150 may be processed by storage processor 152 (e.g., via storage management process 21). Storage processor 152 may include cache memory system 172. Examples of cache memory system 172 may include but are not limited to a volatile, solid-state, cache memory system (e.g., a dynamic RAM cache memory system) and/or a non-volatile, solid-state, cache memory system (e.g., a flash-based, cache memory system). During operation of storage processor 152, content 168 to be written to target 150 may be received by storage processor 152 (e.g., via storage management process 21) and initially stored (e.g., via storage management process 21) within front end cache memory system 172.

The main idea behind delta logging is to just log the actual changes and postpone any massive copying (e.g., copy/copy/swap) until Hash Based Sorted Buckets (HBSB) destage time, since it may turn out not to be necessary in the end. It should be noted, that this approach may create dependences between different metadata (MD) pages in general cases, so mapper pages deletes/updates should be handled carefully, since some other page may depend on this page. Regarding snapshots/volume operations logging schema that may be used with the present disclosure, each command that creates some dependence (e.g., creates snapshot, merge, etc.) generally add to the delta log two records of the following type:

LI2:DependOn:LI1 (or LI2:ChildOf:LI1, or.); the semantics is that page LI2 depends on LI1.

LI1:RequiredFor:LI2 (or LI1 ParentOf:LI2, or.) the semantics is that page LI1 is required for LI2.

Notably, two of those records create a time relationship between L1 and L2 buckets: type of synchronization point. Each command (like delete, etc.), is no more than a specific record in the delta log, and no data is actually deleted. The new LI is allocated on mapper page split, but no pointers are actually copied. The system may add to the delta log only real delta changes.

All the page updates are happening on HBSB destage time only. Hence, at a destage time, HBSB will contain complete set information allowing the system to reconstruct any MD page (independent of specific operations (split/merge/delete ... ) that were performed when this HBSB was active).

It may be notable that there may be a strong limitation, that mapper pages cannot be changed in the MD store by any flow besides the regular HBSB destage. So, the system may have a clear limitation (i.e., mapper MD pages are never "bulk" written). Regarding resolving HBSB destage and dependences, since now there are dependences between pages, the correct destage order may be critically important (e.g., it cannot be random any longer). The following recursive algorithm may be used:

Start HBSB destage
For each page LI1 found in the HBSB
Find all the LI1:RequiredFor:LI_XYZ records; For each such LI_XYZ records
Destage LI_XYZ page (i.e. recursive call); /* hence we guarantee that all pages depends on this are destaged before */Search
for LI1:_DependOn_:LI_ABC record;
If found
Read LI_ABC page
Find LI_ABC:RequiredFor:LI1 if found
Apply all the LI_ABC deltas before this record Else
    Apply all LI_ABC the deltas
    Use this page as a Base for LI1 construction
  Else
    Read LI_ABC page and use it as a Base
    Apply all the LI1 deltas to the Base
  If there is LI1:Remove record
    Add LI1 to "remove_list" (content of the remove_list will be sent to TrashBin and other post-processing after HBSB destage completion)
  else
    Write Base to LI1 RAID location
  End of LI1 destage
  Process "remove_list"; For each removed LI:
    Update IDP types (copy/source) if need to removed LI-s, poi, sent LI to TrashBin, etc.)
    Do all the required decref-s
    Release the LI (send to TrashBin)
    Do other post-destage processing (TBD)
End of HBSB destage A HBSB unique ID may be used. For example, with dependences introduced, the destage flow (and mapper page build in general) may no longer be idempotent. The system must track whether or not the page was already destaged and thus contain deltas from the current "destaging HBSB" and prevent (1) repeatable page destage (restart or other flows) and (2) applying changes from "destaging HBSB" on already destaged mapper page in read/Cache miss flow. To provide this protection/prevention, the system may assign a unique HBSB_ID to each HBSB; HBSB_ID growing monotonically. The system may always persist it in the RawDeltaLog as a specific delta when switching the HBSBs. The system may always put it inside the MD page when destaging the page. When the system reads the page from the MD store, it may always check its HBSB against current destaging HBSB HBSB_ID and if they are the same, the system does not replay changes from destaging HBSB on the read page (in read flow), and the system does not destage it again (restart flow and other).

Applying a delta logging approach (e.g., in a storage cluster(s)) may avoid logging of full metadata (MD) pages, which may waste the log/journal resources). As such, just the actual data changes (e.g., delta tuples) may be logged instead. However, in snapshot created flows, there may still be a need to copy/log the entire mapper MD pages (e.g., top/mid/leaf). This massive delta logging (of actually duplicated data) may cause delta log infrastructure overloading, and thereby still wasting NVRAM bandwidth, that causes performance degradation.

To address this example and non-limiting problem, as will be discussed below, the present disclosure may involve a "lazy snapshot" with a particular delta log based architecture that may enable the avoidance of the mass logging of copied pointers, and just the specific delta tuple defining the snapshots relationships may be logged instead. The actual snapshot MD page may be built during the destage flow, if the snapshot is long-life enough and it was not deleted before the destage occurs.

Consider a storage cluster based on a metadata delta log architecture. Any update of an MD page in such an architecture may be represented by the corresponding LI:EI:T:V delta tuple, where "LI" is a unique Logical Index of a MD page, "EI" is a reference to the specific entry (offset) inside the MD page, "T" is the type of the change (and may also define the size of the new data payload), and "V" is the new (changed) data fragment of this MD page (where its size is defined by "T"). In the example, all the tuples are maintained in cluster memory and have the index for quick efficient searching of changes related to any specific MD page LI. Further consider the use of a 3-level mapper tree to map the logical address to the physical data location, e.g.: (Top->Mid->Leaf scheme). In the example, the snapshot creation (and non-optimized snapshot related flows) in such a system are shown in the example FIG. 4, where the "volume create" is labeled as "1", "snapshot create" is labeled as "2", "write to volume (mid split)" is labeled as "3", and "write to volume (leaf split)" is labeled as "4".

Unfortunately, creating and deleting snapshots typically involves a lot of algorithmic overhead (e.g., the system is still logically creating/deleting the MD pages (Tops/Mids/Leafs) for short lived snapshots, although the system is using delta logging to log only the short delta tuples, and not the whole 4$k$-8$k$ MD page). Particularly, if the system only wrote a single new entry on L2, then the system may still need to delta log all remaining 511 entries from L1 to L2. This still must occur even if the corresponding MD page is never destaged (i.e., the corresponding snapshot was deleted before the first destage), in case the L1 page is reused. This may overload the delta log structure, waste NVRAM bandwidth, and may cause performance degradation. Thus, the present disclosure may involve a "lazy snapshot" with a particular delta log based architecture that may enable the avoidance of the mass logging of copied pointers, and just the specific delta tuple defining the snapshot's relationships may be logged instead. The actual snapshot MD page may be built during the destage flow, if the snapshot is long-life enough and it was not deleted before the destage occurs.

Figure 4:
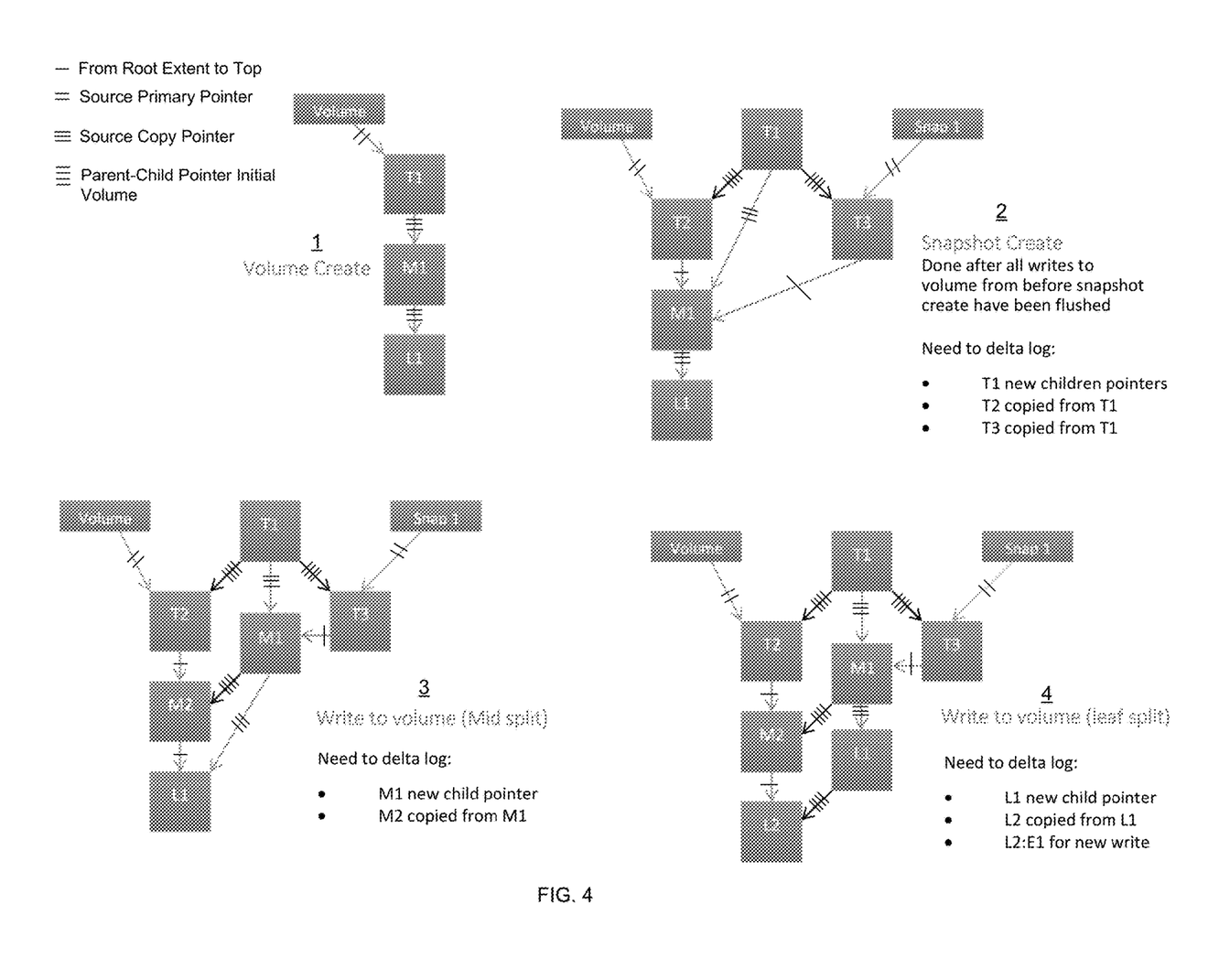
FIG. 4 is an example diagrammatic view of non-optimized snapshot flows according to one or more example implementations of the disclosure.
Figure 5:
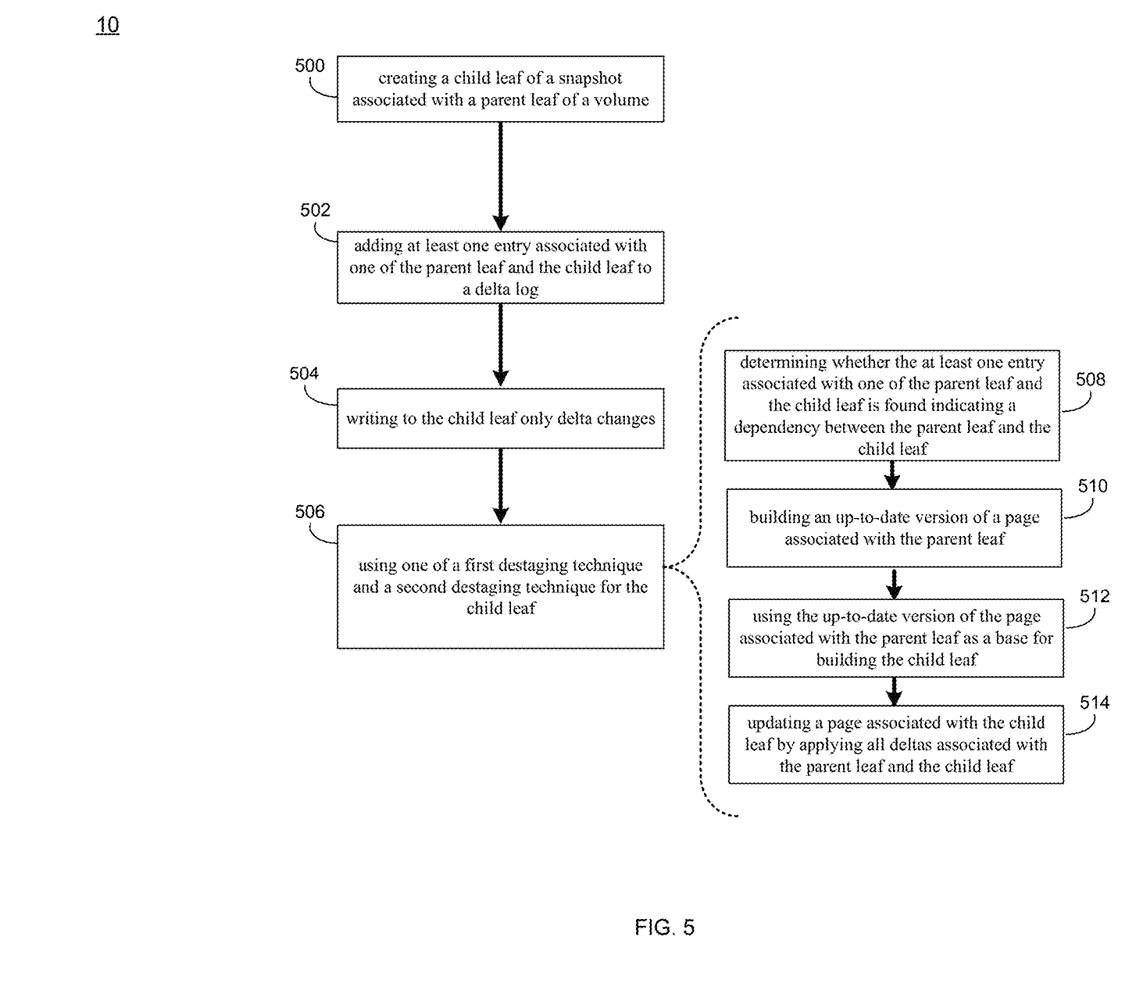
FIG. 5 is an example flowchart of a snapshot process according to one or more example implementations of the disclosure.

The Snapshot Process:

As discussed above and referring also at least to the example implementations of FIGS. 3-5, snapshot process 10 may create 500, by a computing device, a child leaf of a snapshot associated with a parent leaf of a volume. Snapshot process 10 may add 502 at least one entry associated with one of the parent leaf and the child leaf to a delta log. Snapshot process 10 may write 504 only delta changes to the child leaf. Snapshot process 10 may use 506 one of a first destaging technique and a second destaging technique for the child leaf.

It will be appreciated that while the term "snapshot process" is used throughout, the actual types of processes carried out in the present disclosure need not actually be part of a snapshot process. For example, as discussed below, the present disclosure involves a destaging process, which may be responsible for building up-to-date pages from a HBSB+ MD store and writing them to the MD store. As such, the term "snapshot process" (or action) (which may be responsible for adding the corresponding deltas (e.g., ChildOf, ParentOf, etc.) to the HBSB) should be taken as a general term to include any of the processes carried out by the present disclosure, including but not limited to destaging. Therefore, the terms snapshot process and destaging process may be used interchangeably where appropriate.

In some implementations, snapshot process 10 may create 500, by a computing device (e.g., computer 12), a child leaf (e.g., LI2) of a snapshot associated with a parent leaf (e.g., LI1) of a volume (such as those shown in example FIG. 4), and in some implementations, snapshot process 10 may add 502 at least one entry associated with one of the parent leaf and the child leaf to a delta log. For example, for a snapshot, snapshot process 10 may create its own leaf, which is a copy of the parent leaf. Thus, in the example, there may be two completely different leaves: one (say LI1) belonging to the original volume, and another (say LI2) belonging to the snapshot associated with the volume (and some dependence between them). As will be discussed below, instead of immediately copying LI1 to LI2, the present disclosure may skip the copy, and add ChildOf/ParentOf records instead. As such, the system may be able to make the required copies, etc. later.

For example, each time snapshot process 10 creates 500 a snapshot (specifically a new (child) leaf such as LI2), snapshot process 10 may add 502 to a delta log a specific entry (e.g., "LI2:IS_CHILD_OF:LI1" in some implementations also "LI1:IS_PARENT_OF:LI2)". In the example, LI2 is the newly created (child) leaf of the snapshot, and LI1 is the parent (source or parent) leaf. Using this technique, snapshot process 10 may create the link/mapping between parent and child.

Put another way, each time snapshot process 10 splits the above-noted metadata (MD) page (e.g., as a result of the first writing to the corresponding MD page after the snapshot creation), snapshot process 10 may add the corresponding relationship records to the MD delta log instead of actual copying the data and/or the pointers to the data. For example, and referring again to the "Write to volume (leaf split)" shown in the bottom right portion of FIG. 4, there is shown a leaf with the unique index LI1. Initially, both the original volume and the snapshot where pointed to (i.e. M1→L1 and M2→L1) and this was acceptable, since the "volume" and "snapshot" (i.e., "snap 1") point to the same data. Then, snapshot process 10 overwrites some logical address (that leaf LI1 is responsible for), such as, for example, changing some pointer with entry index EI1 inside leaf LI1 to the "NEW_PTR" or similar notation. As a result, snapshot process 10 may need to split the leaf, such that the snapshot should continue point to the old/untouched leaf (i.e., M1→L1), while the volume should point to the updated variant of the leaf now (i.e., snapshot process 10 may allocate the new leaf with the unique index LI2.

In some implementations, instead of the current approach of copying LI1 to LI2 (i.e., adding the entire content of LI1, as 512 deltas to the delta log), snapshot process 10 may just atomically add to the specific records "LI2:IS_CHILD_OF: LI1" (or similar notation) that goes to a bucket of LI2 and LI1:IS_PARENT_OF:LI2 (or similar notation) that goes to the bucket of LI1. In the example, snapshot process 10 may add the update of LI2 (the result of the overwrite) as LI2:EI1:NEW_PTR to the delta log. Then, snapshot process 10 may change the pointer inside the volume's MID (M2) to point to the new leaf LI1 (i.e., M2→LI2).

In some implementations, snapshot process 10 may write 504 only delta changes to the child leaf. For instance, snapshot process 10 may only write 504 to LI2 the delta changes (i.e., no copies of untouched data). For example, when some addresses in volume (that LI2 is responsible for) are overwritten, snapshot process 10 may add entries like "LI2:EI1:New_Ptr1," "LI2:EI9:New_Ptr57," etc. and as a result, only the delta changes (only the data that has changed) is written to LI2.

In some implementations, a destage process may be responsible for building up-to-date pages based on deltas from the HBSB store and old pages from the MD store and writing them to the MD store. Notably, it may not matter whether snapshots are involved or not (e.g., many systems do not use snapshots at all, but still destage from the HBSB, just without records like ChildOf, ParentOf, etc., as in the present example.) The destage process may be responsible for the interpretation of some or all the records found in the HBSB (including ChildOF and ParentOf, etc.). As noted above, the snapshot process (or action) may be responsible for adding the corresponding deltas (e.g., ChildOf, ParentOf, etc.) to the HBSB.

In some implementations, snapshot process 10 may use 506 one of a first destaging technique and a second destaging technique for the child leaf. For instance, as will be discussed below, there may be at least two different destaging techniques. One technique is the "normal" destaging technique that may include one or more phases. For example, phase one of the "normal" destaging technique may include (1) maintaining per-bucket ownership. The first node may destage the even buckets, and the second node may destage the odd buckets. (2) All deltas from the destaging HBSB are written to the HBSB tablet. For each bucket, the corresponding binary tree is dumped to the 4K page, so that deltas inside this page are sorted by LI. If there several deltas for the same LI, the insertion order is preserved. (3) Destaging HBSB Bloom Filter is written to the RAID6 (master node). (4) The deltas from "in memory" HBSBs is replayed/merged to the Main Metadata copy (MMD), thus, the MMD is a less amortized copy. (5) The RawDeltaLog tail is moved so that release just destages entries/chunk. (6) The destaging HBSB is cleared to be prepared for the next HBSB switch.

Phase two of the "normal" destaging technique may include (1) reading, for each bucket, the corresponding bucket page from each active HBSB tablet. The set of all pages related to the same buckets forms the "bucket working set." (2) Each "bucket working set" is destaged as follows: (i) all deltas, related to the same LI are merged. The deltas time/insertion order (between tablets) is preserved. (ii) the original MD page is read from RAID, all the deltas are merged/replayed to the page (in time order) and the updated page is written to RAID (e.g., SSD). (3) after the current destage phase 2 cycle is completed, all destaged tablets are freed/deleted, and corresponding Bloom Filters are removed/freed from the Active Bloom Filter's Area.

In some implementations, using 506 one of the first destaging technique and the second destaging technique for the child leaf may include determining 508 whether the at least one entry associated with one of the parent leaf and the child leaf is found in the delta log indicating a dependency between the parent leaf and the child leaf. For example, as will be discussed below, the main question to be asked is whether or not the parent leaf (LI1) depends on the child leaf (LI2). If not, then the destaging for both leafs may be done with the first technique, otherwise known as the "normal" way (e.g., read the old version of the same page and apply the corresponding deltas. If yes, (this is the case of a snapshot), then the second technique may be used for destaging (e.g., reading the old version of another page (parent of this one) by using the child leaf as a base for building the parent leaf (instead of using the parent leaf as in first technique) and apply the parent leaf deltas on this base. Since snapshots just create dependences (ChildOf, ParentOf) between pages, instead of copying the page, snapshot process 10 may just mark that it depends on the child leaf (and so should be copied when it is destaged). For instance, during the destage of LI2 (if this point is reached before the snapshot is deleted), snapshot process 10 may look for "IS_CHILD_OF" (or similar notation) entry for the LI2. In some implementations, the first destaging technique may be used 506 when the at least one entry associated with one of the parent leaf and the child leaf is not found in the delta log indicating a lack of the dependency between the parent leaf and the child leaf. For instance, if the "IS_CHILD_OF" (or similar notation) entry for the LI2 is determined 508 not to be found, the "normal" LI2 destage may occur.

That is, snapshot process 10 may read the old version of the page for the LI2 (if it exist) or initialize the page (if it is new) and just apply all the deltas related to LI2 in the insertion order. Each delta may represent the corresponding update of the MD page (e.g., leaf) as a result of a write operation. Without a write operation, there is no delta. HBSB is destaged and cleaned periodically. Consider that there were no write operations to a snapshot (in a corresponding address range) after its creation. Thus, there are just no updates (deltas) for the corresponding top/mid/leaf. As well, the leaf may be split usually (but not mandatorily) when either volume or snapshot is written after snapshot creation (otherwise there would not be a need to split, since the leafs are exactly the same and only the one instance is enough). As such, if snapshot process 10 sees record "LI1:Child-OfLI2" then most likely the delta will be seen either for LI1 or for LI2 after this record It will be appreciated that while the present disclosure includes examples of splitting "leafs," the present disclosure may be used similarly with all three types of mapper pages (e.g., top, mid, and leaf pages). As such, the use of splitting leafs should be taken as example only and not to otherwise limit the scope of the disclosure.

In some implementations, the second destaging technique may be used 506 when the at least one entry associated with one of the parent leaf and the child leaf is found in the delta log indicating the dependency between the parent leaf and the child leaf, and in some implementations, the second destaging technique may include building 510 an up-to-date version of a page associated with the parent leaf, and using 512 the up-to-date version of the page associated with the parent leaf as a base for building the child leaf. For example, if the IS_CHILD_OF" (or similar notation) entry for the LI2 is determined 508 to be found, snapshot process 10 may take from this (found) record LI1 reference. That is, from the record LI2:IS_CHILD_OF:LI1, snapshot process 10 may understand that the target/destage page is based on page LI1, so snapshot process 10 may need first build 512 up-to-date version of page LI1 and use 512 it as a base for LI2 construction.

In some implementations, the second destaging technique may further include updating 514 a page associated with the child leaf by applying all deltas associated with the parent leaf and the child leaf. For example, snapshot process 10 may read LI1 (the old (not up-to-date) version of the page LI1, and apply all LI1 deltas before the split (i.e. before IS_PARENT_OF record). That is, snapshot process 10 may build the version of page LI1, exactly like it was at the moment of the split, which may be used as a base for building LI2. Snapshot process 10 may then apply all LI2 deltas (all those after IS_CHILD_OF record). That is, snapshot process 10 may use the page built in the previous step (LI1 at the time of split) as a base and apply all the changes of LI2 that happened after the split. So, in the end, the result is an up-to-date page LI2. Snapshot process 10 may then write the result page to LI2. In some implementations, the present disclosure may work recursively (i.e., LI1 maybe IS_CHILD_OF LI3, etc.). Hence, the present disclosure may avoid bulk entries copying, such that the final MD page (leaf) is built just during destaging, and only in case the snapshot was not deleted before the first destage.

It will be appreciated that while LI1 and LI2 have been described, any number of leaves may be used without departing from the scope of the disclosure. Similarly, other variations of RAID may also be used without departing from the scope of the present disclosure.

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method comprising:
creating, by a computing device, a child leaf of a snapshot associated with a parent leaf of a volume within a storage cluster, wherein the child leaf and parent leaf are both part of a three-level mapper tree, each including a logical address of a metadata page that maps to a physical data location of the metadata page;
adding an entry associated with the parent leaf and the child leaf to a delta log, wherein an entry associated with the child leaf indicates that the child leaf is a result of an overwrite;
writing only delta changes to the child leaf; and
using one of a first destaging technique and a second destaging technique for the child leaf, wherein one or more of the first destaging technique and second destaging technique includes building one or more up-to-date pages based on deltas from a Hash Based Sorted Buckets (HBSB) store and one or more existing pages from a metadata store and writing the deltas from the HBSB store and one or more existing pages from the metadata store to the metadata store, wherein using one of the first destaging technique and the second destaging technique for the child leaf includes:

determining that the entry associated with the parent leaf and the child leaf is found in the delta log indicating the dependency;

building an up-to-date version of a page associated with the parent leaf by applying all deltas associated with the parent leaf before the creation of the child leaf in time order;

using the up-to-date version of the page associated with the parent leaf as a base for building the child leaf; and updating a page associated with the child leaf by applying all deltas associated with the child leaf after the creation of the child leaf in time order.

2. The computer-implemented method of claim 1 wherein using one of the first destaging technique and the second destaging technique for the child leaf includes determining whether the entry associated with the parent leaf and the child leaf is found in the delta log indicating a dependency between the parent leaf and the child leaf.

3. The computer-implemented method of claim 2 wherein the first destaging technique is used when the entry associated with the parent leaf and the child leaf is not found in the delta log indicating a lack of the dependency.

4. A computer program product residing on a non-transitory computer readable storage medium having a plurality of instructions stored thereon which, when executed across one or more processors, causes at least a portion of the one or more processors to perform operations comprising:

creating, by a computing device, a child leaf of a snapshot associated with a parent leaf of a volume within a storage cluster, wherein the child leaf and parent leaf are both part of a three-level mapper tree, each including a logical address of a metadata page that maps to a physical data location of the metadata page;

adding an entry associated with the parent leaf and the child leaf to a delta log, wherein an entry associated with the child leaf indicates that the child leaf is a result of an overwrite;

writing only delta changes to the child leaf; and using one of a first destaging technique and a second destaging technique for the child leaf, wherein one or more of the first destaging technique and second destaging technique includes building one or more up-to-date pages based on deltas from a Hash Based Sorted Buckets (HBSB) store and one or more existing pages from a metadata store and writing the deltas from the HBSB store and one or more existing pages from the metadata store to the metadata store, wherein using one of the first destaging technique and the second destaging technique for the child leaf includes:

determining that the entry associated with the parent leaf and the child leaf is found in the delta log indicating the dependency;

building an up-to-date version of a page associated with the parent leaf by applying all deltas associated with the parent leaf before the creation of the child leaf in time order;

using the up-to-date version of the page associated with the parent leaf as a base for building the child leaf; and updating a page associated with the child leaf by applying all deltas associated with the child leaf after the creation of the child leaf in time order.

5. The computer program product of claim 4 wherein using one of the first destaging technique and the second destaging technique for the child leaf includes determining whether the entry associated with the parent leaf and the child leaf is found in the delta log indicating a dependency between the parent leaf and the child leaf.

6. The computer program product of claim 5 wherein the first destaging technique is used when the entry associated with the parent leaf and the child leaf is not found in the delta log indicating a lack of the dependency.

7. A computing system including one or more processors and one or more memories configured to perform operations comprising:

creating, by a computing device, a child leaf of a snapshot associated with a parent leaf of a volume within a storage cluster, wherein the child leaf and parent leaf are both part of a three-level mapper tree, each including a logical address of a metadata page that maps to a physical data location of the metadata page;

adding an entry associated with the parent leaf and the child leaf to a delta log, wherein an entry associated with the child leaf indicates that the child leaf is a result of an overwrite;

writing only delta changes to the child leaf; and using one of a first destaging technique and a second destaging technique for the child leaf, wherein one or more of the first destaging technique and second destaging technique includes building one or more up-to-date pages based on deltas from a Hash Based Sorted Buckets (HBSB) store and one or more existing pages from a metadata store and writing the deltas from the HBSB store and one or more existing pages from the metadata store to the metadata store, wherein using one of the first destaging technique and the second destaging technique for the child leaf includes:

determining that the entry associated with the parent leaf and the child leaf is found in the delta log indicating the dependency;

building an up-to-date version of a page associated with the parent leaf by applying all deltas associated with the parent leaf before the creation of the child leaf in time order;

using the up-to-date version of the page associated with the parent leaf as a base for building the child leaf; and updating a page associated with the child leaf by applying all deltas associated with the child leaf after the creation of the child leaf in time order.

8. The computing system of claim 7 wherein using one of the first destaging technique and the second destaging technique for the child leaf includes determining whether the entry associated with the parent leaf and the child leaf is found in the delta log indicating a dependency between the parent leaf and the child leaf.

9. The computing system of claim 8 wherein the first destaging technique is used when the entry associated with the parent leaf and the child leaf is not found in the delta log indicating a lack of the dependency.

* * * * *